US009628981B2

(12) United States Patent
Park et al.

(10) Patent No.: US 9,628,981 B2
(45) Date of Patent: Apr. 18, 2017

(54) METHOD FOR CHANGING MNO IN EMBEDDED SIM ON BASIS OF SPECIAL PRIVILEGE, AND EMBEDDED SIM AND RECORDING MEDIUM THEREFORE

(75) Inventors: Jaemin Park, Seoul (KR); Jinhyoung Lee, Seoul (KR); Kwangwuk Lee, Seoul (KR)

(73) Assignee: KT Corporation, Seongnam-si (KR)

( * ) Notice: Subject to any disclaimer, the term of this patent is extended or adjusted under 35 U.S.C. 154(b) by 49 days.

(21) Appl. No.: 14/129,485

(22) PCT Filed: Jul. 6, 2012

(86) PCT No.: PCT/KR2012/005377
§ 371 (c)(1),
(2), (4) Date: Dec. 26, 2013

(87) PCT Pub. No.: WO2013/009044
PCT Pub. Date: Jan. 17, 2013

(65) Prior Publication Data
US 2014/0134981 A1  May 15, 2014

(30) Foreign Application Priority Data

Jul. 8, 2011 (KR) .................. 10-2011-0067779
Oct. 21, 2011 (KR) .................. 10-2011-0107916

(51) Int. Cl.
*H04M 3/16* (2006.01)
*H04W 8/20* (2009.01)
(Continued)

(52) U.S. Cl.
CPC .......... *H04W 8/205* (2013.01); *H04L 63/0853* (2013.01); *H04L 63/0869* (2013.01);
(Continued)

(58) Field of Classification Search
CPC ..... H04W 8/205; H04W 8/183; H04W 12/06; H04W 28/02; H04W 28/0215;
(Continued)

(56) References Cited

U.S. PATENT DOCUMENTS 8,626,165 B1 * 1/2014 Narasimhan .......... H04L 63/102
370/252
2009/0191857 A1 * 7/2009 Horn ....................... H04W 4/00
455/419

(Continued)

FOREIGN PATENT DOCUMENTS

WO  2010/102236 A2  9/2010

OTHER PUBLICATIONS

3GPP TR33.812 V9.1.0, "Feasibility study on the security aspects of remote provisioning and change of subscription for Machine to Machine (M2M) equipment"; (Release 9), Apr. 11, 2010.
(Continued)

*Primary Examiner* — Amancio Gonzalez
(74) *Attorney, Agent, or Firm* — Sughrue Mion, PLLC

(57) ABSTRACT

The present invention provides a method and an apparatus for managing (mutual authorization with a SIM, secure communication, channel formation, application and data issuance, etc.) an embedded SIM (eSIM or eUICC) by generating and extraditing a security domain using Global-Platform technology in which authorized management privilege and delegated management privilege functions are implemented.

15 Claims, 7 Drawing Sheets

(51) Int. Cl.
*H04W 12/06* (2009.01)
*H04L 29/06* (2006.01)
*H04W 12/08* (2009.01)
*H04W 48/18* (2009.01)

(52) U.S. Cl.
CPC .......... *H04W 12/06* (2013.01); *H04W 12/08* (2013.01); *H04W 48/18* (2013.01)

(58) Field of Classification Search
CPC ............ H04W 36/00; H04W 36/0005; H04W 36/0011; H04W 36/0016; H04W 36/0022; H04W 36/0027; H04W 36/0033; H04W 36/0055; H04W 36/005; H04L 63/0869
USPC ...... 455/428, 432.1, 433–439, 442, 525, 62, 455/63.3
See application file for complete search history.

(56) References Cited

U.S. PATENT DOCUMENTS

| 2010/0106967 | A1 | 4/2010 | Johansson et al. | |
| 2010/0284367 | A1* | 11/2010 | Koo et al. | 370/331 |
| 2011/0306318 | A1* | 12/2011 | Rodgers | H04W 8/183 455/410 |
| 2012/0275442 | A1* | 11/2012 | Malets | H04W 4/16 370/338 |

OTHER PUBLICATIONS

International Search Report of PCT/KR2012/005377 dated Jan. 24, 2013.

* cited by examiner

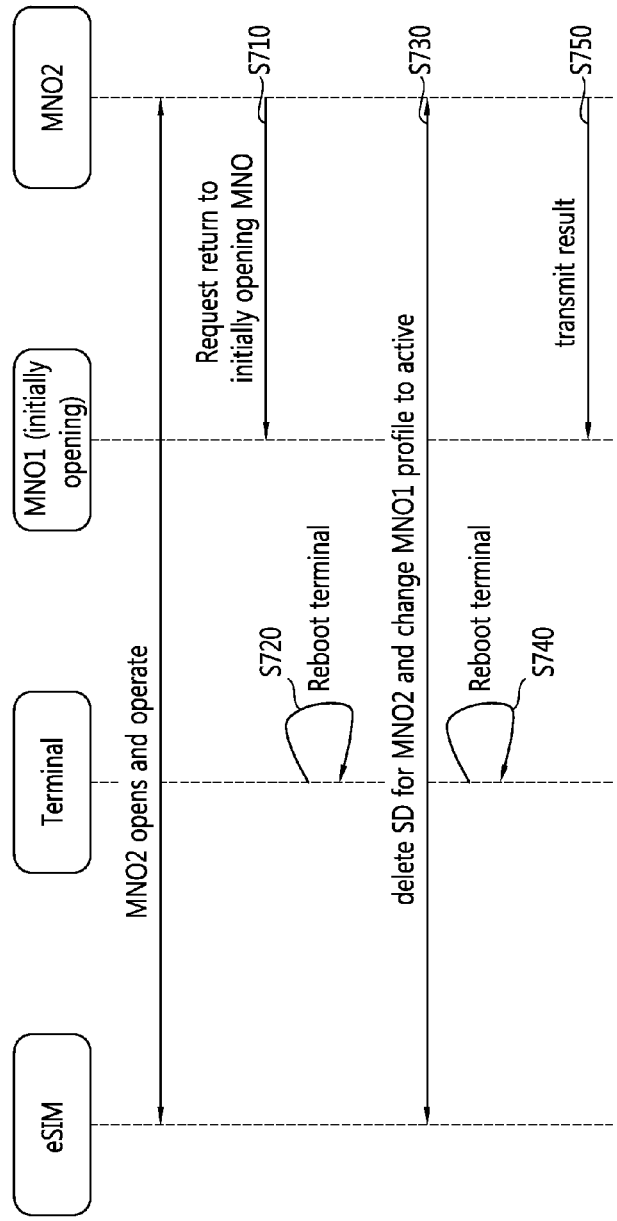

METHOD FOR CHANGING MNO IN EMBEDDED SIM ON BASIS OF SPECIAL PRIVILEGE, AND EMBEDDED SIM AND RECORDING MEDIUM THEREFORE

CROSS REFERENCE TO RELATED APPLICATIONS

This application is a National Stage of International Application No. PCT/KR2012/005377, filed on Jul. 6, 2012, claiming priority based on Korean Patent Application No. 10-2011-0067779, filed Jul. 8, 2011, and Korean Patent Application No. 10-2011-0107916, the contents of all of which are incorporated herein by reference in their entirety.

TECHNICAL FIELD

The present invention relates to a method of changing a mobile network operator (MNO) in an embedded subscriber identity module (hereinafter, referred to as an "eSIM" or "eUICC") based on privilege and an eSIM for the same.

BACKGROUND ART

A Universal Integrated Circuit Card (UICC) is a smart card inserted into a terminal and used as a user authentication module. The UICC may store personal information on a user and information on a mobile network operator of a mobile service subscribed by the user. For example, the UICC may include an International Mobile Subscriber Identity (IMSI) to identify a user. The UICC may also be referred to as a Subscriber Identity Module (SIM) card in the Global System for Mobile Communications (GSM), and as a Universal Subscriber Identity Module (USIM) in the Wideband Code Division Multiple Access (WCDMA).

When the user installs the UICC in a user terminal, user authentication is automatically achieved using the information stored in the UICC, enabling the user to conveniently use the terminal. Further, when the terminal is replaced, the user may installs the UICC detached from the terminal on a new terminal, thereby conveniently changing the terminal.

A terminal required to be small-sized, for example, a terminal for machine-to-machine (M2M) communications, is difficult to make small when manufactured in a UICC detachable structure. Thus, an embedded UICC (eUICC) that is not detachable is introduced. The eUICC records information on the user using the UICC in an International Mobile Subscriber Identity (IMSI) form.

A conventional UICC is detachable from a terminal, and thus a user may open the terminal regardless of a terminal type or a mobile carrier. However, an IMSI may be allocated to an eUICC on the premise that the terminal is available under a particular mobile network operator (MNO) from when manufactured. Thus, both MNOs and M2M terminal makers to sell terminals cannot but pay close attention to goods in stock and a rise in product price may occur. Also, users may undergo inconvenience of not allowing a change of MNOs for terminals. Thus, users require a method of opening a terminal regardless of mobile carriers even for an eUICC.

Meanwhile, recent introduction of an eUICC brings a need to update information on subscribers to a plurality of mobile carriers to the UICC remotely, and accordingly a subscription manager (SM) or profile manager (PM) for managing information on subscribers is discussed.

However, due to a physical difference from a conventional detachable SIM, the eSIM environment involves management of SIM data in a software form, and accordingly methods based on GlobalPlatform technology are currently under discussions. However, an MNO may need to lead providing eSIM based services, instead of a third party, due to issues about ownership of keys and initiative in eSIM based business (communications and optional services) on GlobalPlatform, but no concrete measures have been found yet.

DISCLOSURE OF INVENTION

Technical Problem

An aspect of the present invention is to provide a method and an apparatus for managing an embedded subscriber identity module (eSIM) based on GlobalPlatform in a communication environment including the eSIM, conducting provisioning and changing a mobile network operator (MNO).

An aspect of the present invention is to provide a method and an apparatus for managing an eSIM using privilege in a communication environment including the eSIM, conducting provisioning and changing an MNO.

An aspect of the present invention is to provide a method and an apparatus for managing an eSIM using a security domain (SD) having privilege in a communication environment including the eSIM, conducting provisioning and changing an MNO.

An aspect of the present invention is to provide a method and an apparatus for managing a card (conducting mutual authorization with an SIM, secure communications, channel formation, and application and data issuance) using GlobalPlatform technology in which authorized management privilege and delegated management privilege functions are implemented.

Technical Solutions

According to an aspect of the present invention, there is provided a method of changing a mobile network operator (MNO) using an embedded Subscriber Identity Module (eSIM) linked to at least one MNO, the eSIM storing a provisioning profile and a profile of the at least one MNO, the method including receiving a security domain (SD) having delegated management privilege or authorized management privilege over a receiving MNO from a donor MNO, and connecting to the receiving MNO using the provisioning profile, and then conducting SD authorization and receiving a necessary profile or data.

According to another aspect of the present invention, there is provided a method of changing an MNO using an eSIM linked to at least one MNO, the eSIM storing a provisioning profile and a profile of the at least one MNO, the method including receiving a return request from an initially opening MNO, connecting to the initially opening MNO using the provisioning profile, and deleting a currently activated profile (including an SD) of a MNO using an issuer security domain (ISD) and rendering an inactivated profile of the initially opening MNO activated.

According to an another of the present invention, there is provided a method of changing an MNO using an eSIM linked to at least one MNO, the eSIM storing a provisioning profile and a profile of the at least one MNO, the method including receiving an SD having delegated management privilege or authorized management privilege over a receiving MNO from an initially opening MNO when a subscription change from a donor MNO to the receiving MNO occurs with the initially opening MNO existing separately, deleting a profile of the donor MNO, and connecting to the receiving MNO using the provisioning profile, and then conducting SD authorization and receiving a necessary profile or data.

According to another aspect of the present invention, there is provided a method of changing an MNO using an MNO1 system as an initially opening MNO and donor MNO, an MNO2 system as a receiving MNO and an eSIM storing a profile of at least one MNO, the method including transmitting an MNO change request message from the MNO2 system to the MNO1 system, generating an SD having delegated management privilege or authorized management privilege over MNO2 by the MNO1 system using an ISD key, inactivating a profile of MNO1 by the MNO1 system, and connecting to the MNO2 system and being provided with a service by a terminal equipped with the eSIM after booted up.

According to another aspect of the present invention, there is provided a method of changing an MNO using an MNO1 system as an initially opening MNO, an MNO2 system as a donor MNO, an MNO3 system as a receiving MNO and an eSIM storing a profile of at least one MNO, the method including transmitting an MNO change request message from the MNO3 system to the MNO1 system, generating an SD having delegated management privilege or authorized management privilege over MNO3 by the MNO1 system using an ISD key, deleting a profile of MNO2 by the MNO1 system, and connecting to the MNO3 system and being provided with a service by a terminal equipped with the eSIM after booted up.

According to another aspect of the present invention, there is provided an eSIM linked to at least one MNO, the eSIM storing a provisioning profile and a profile of the at least one MNO, receiving an SD having delegated management privilege or authorized management privilege over a receiving MNO from a donor MNO, and connecting to the receiving MNO using the provisioning profile and then conducting SD authorization and receiving a necessary profile or data.

According to another aspect of the present invention, there is provided an eSIM linked to at least one MNO, the eSIM storing a provisioning profile and a profile of the at least one MNO, receiving an SD having delegated management privilege or authorized management privilege over a receiving MNO from an initially opening MNO when a subscription change from a donor MNO to the receiving MNO occurs with the initially opening MNO existing separately, deleting a profile of the donor MNO, and connecting to the receiving MNO using the provisioning profile and then conducting SD authorization and receiving a necessary profile or data.

According to another aspect of the present invention, there is provided a recoding medium recording a program installed in an eSIM linked to at least MNO, the eSIM storing a provisioning profile and a profile of the at least one MNO and the program conducting a function of receiving an SD having delegated management privilege or authorized management privilege over a receiving MNO from a donor MNO, a function of inactivating a profile of the donor MNO, and a function of connecting to the receiving MNO using the provisioning profile and then conducting SD authorization and receiving a necessary profile or data.

According to another aspect of the present invention, there is provided a recoding medium recording a program installed in an eSIM linked to at least MNO, the eSIM storing a provisioning profile and a profile of the at least one MNO and the program conducting a function of receiving an SD having delegated management privilege or authorized management privilege over a receiving MNO from an initially opening MNO when a subscription change from a donor MNO to the receiving MNO occurs with the initially opening MNO existing separately, a function of deleting a profile of the donor MNO, and a function of connecting to the receiving MNO using the provisioning profile and then conducting SD authorization and receiving a necessary profile or data.

BRIEF DESCRIPTION OF DRAWINGS

FIG. 7 is a flowchart illustrating a process of returning to an initially opening MNO using an eSIM according to an exemplary embodiment of the present invention.

MODE FOR CARRYING OUT THE INVENTION

Figure 1:
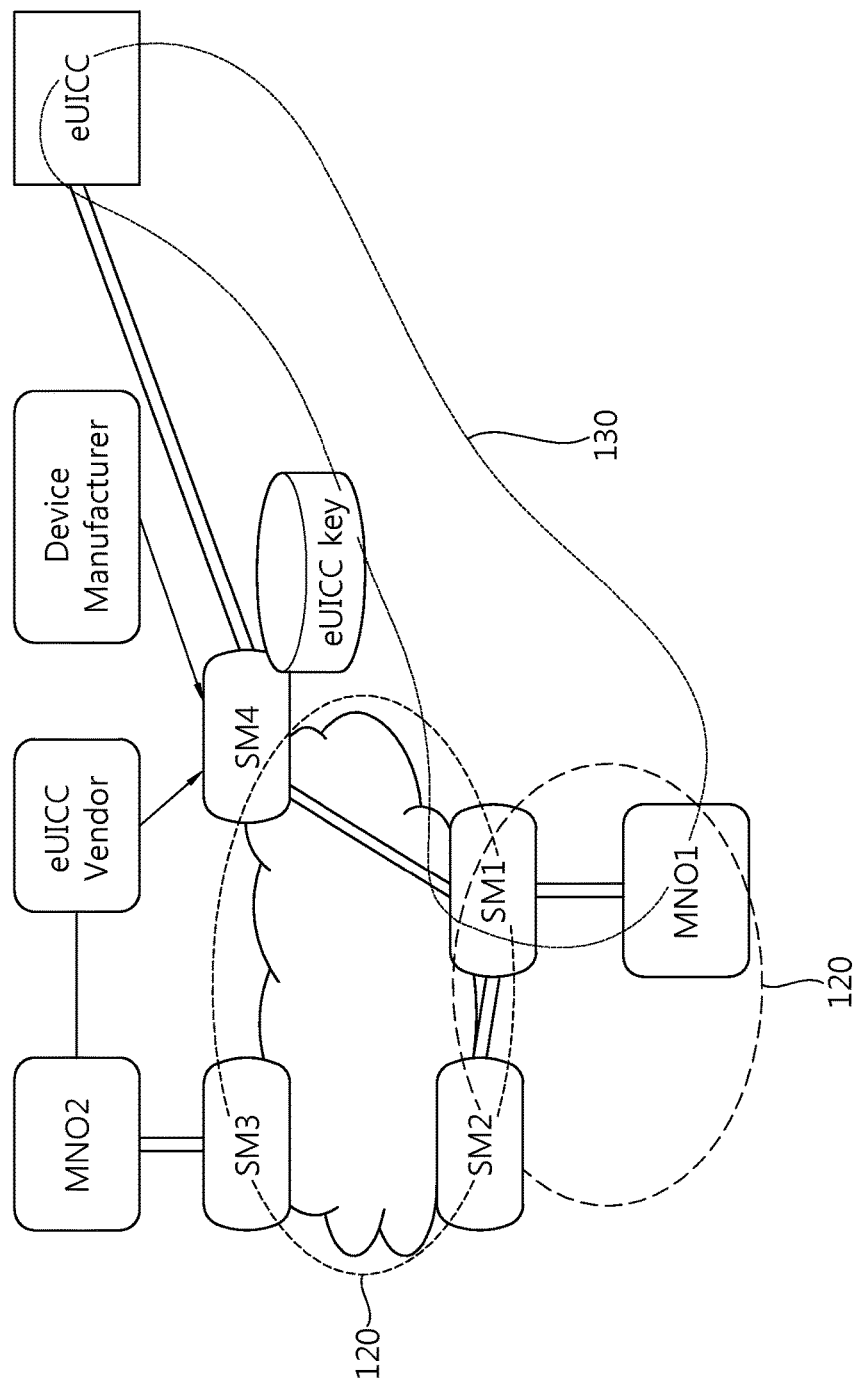
FIG. 1 illustrates an entire service architecture including an eSIM or eUICC according to the present invention.

Hereinafter, some exemplary embodiments will be described with reference to the accompanying drawings. Like reference numerals in the drawings refer to like elements throughout. In the following description, when detailed descriptions about related well-known functions or structures are determined to make the invention unclear, the detailed descriptions will be omitted herein.

A machine-to-machine (M2M) terminal actively discussed in the Global System for Mobile Communications (GSM) Association (GSMA) is required to be small characteristically. However, when a conventional Universal Integrated Circuit Card (UICC) is used, a separate module which the UICC is mounted on is needed and inserted into the M2M terminal. Thus, when the M2M terminal is manufactured with a UICC-detachable structure, it is difficult to make the M2M small.

Thus, an embedded UICC (eUICC), which is not detachable, is examined. Here, the eUICC mounted on the M2M terminal necessarily stores information on a mobile network operator (MNO) using the UICC in a form of international mobile subscriber identity (IMSI).

However, since the terminal may be allocated the IMSI in the eUICC on the premise that the terminal is available under a particular MNO from when manufactured, both MNOs and M2M terminal makers to sell M2M terminals or UICCs cannot but pay close attention to goods in stock and a rise in product price may occur, which blocks spread of M2M terminals.

As such, unlike a conventional detachable subscriber identity module (SIM), an eUICC or eSIM mounted integrally on a terminal involves many issues about authority to open up an account, initiative in optional service business and subscriber information security due to differences in physical structure. To this end, an international standardization organization such as the GSMA and the European Telecommunications Standards Institute (ETSI) is developing standardizing activities with respect to necessary elements including and a top structure along with related companies such as operators, manufacturers and SIM makers. During discussions on the eSIM, the standardization association centers on a subscription manager (SM), which refers to an entity or function/role to conduct general management of the eSIM, for example, issuing operator information (also referred to as an operator credential, MNO credential, profile, eUICC profile or profile package) to the eSIM and dealing with processes of subscription change or MNO change.

Recently, the GSMA suggests a structure that functions of the SM are divided into SM-data preparation (SM-DP) responsible for generating operator information and SM-secure routing (SM-SR) for directly carrying operator information to the eSIM, and a method of encoding and transmitting a profile, both of which lack technicalities.

In this specification, the eSIM and the eUICC are used to refer to equivalent concepts.

An eSIM is a new concept of SIM technology, which is manufactured by attaching an integrated circuit (IC) chip to a circuit board of a terminal and issuing SIM data (service opening information and optional service information) in a software form over the air (OTA) or via an offline method (technology-based connection of a PC and a USB) in manufacture of the terminal. The IC chip used for the eSIM generally supports a hardware-based crypto co-processor (CCP) to provide generation of a hardware-based public key, and an SIM platform (for example, Java Card Platform) provides an application programming interface (API) for utilizing the public key based on an application (for example, applet). The Java Card Platform is a platform which enables a smart card to have a multi-application and to provide services.

For reasons of limited memory space and security, everyone is not allowed to mount an application on the SIM, and thus not only a platform for mounting an application but also an SIM service management platform responsible for mounting and managing an application on the SIM is needed. The SIM service management platform issues data to an SIM memory area through authentication and security using a management key, and uses specifications of GlobalPlatform, Remote File Management (RFM) and Remote Application Management (RAM) of the ETSI TS 102.226.

An SM as one of important elements in an eSIM environment serves to remotely issue communication and optional service data through a management key, such as a UICC OTA key and a GP ISD key.

The GAMA may divide the functions of the SM into SM-DP and SM-SR. The SM-DP serves to securely build not only an operation profile or operator information but an IMSI, K, OPc, optional service applications and optional service data into a credential package, while the SM-SR serves to securely download the credential package generated in the SM-DP to the eSIM through SIM remote management technology such as OTA or GP secure communication protocol (SCP).

FIG. 1 illustrates an eSIM communication system including an SM.

An architecture of the eSIM communication system using the SM may include a plurality of MNO systems, at least one SM system, an eUICC manufacturer system, a manufacturer system of a device including the eUICC, and an eUICC. In FIG. 1, a dotted line indicates a circle of trust and two solid lines indicate secure links.

In FIG. 1, a structure "circle of trust" is introduced to overlap relationship between similar objects or entities, thus establishing end-to-end trusted relationship between an MNO and an eSIM. That is, MNO1 builds trusted relationship with SM1, SM1 with SM4, and SM4 with the eSIM, thereby ultimately establishing trusted relationship between the MNO and the eSIM.

The eSIM communication system using the SM adopts a function defined as an SM, and a main function of the SM prepares and transmits a package or profile including an MNO credential to the eUICC. The SM function may be directly provided by the MNO, or the MNO may make a contract with a third entity to acquire an SM service. The SM function needs providing by the MNO or third entity. The SM service may be provided by the third entity when commercial relationship is established between the SM and the MNO.

The SM is divided into an SM-DP to securely prepare a plurality profiles related to the eUICC, such as an operation profile and a provisioning profile of the MNO, and an SM-SR to route the profiles, wherein the SM-SR may be linked with a plurality of other SM-SRs based on trusted relationship and the SM-DP is linked to the MNO system.

In the system using the SM of FIG. 1, the SM performs overall management, such as subscription management, optional service management and MNO change management. However, such a system is different from a current communication service led by the MNO and thus may face problems in securing compatibility or reliability.

Meanwhile, GlobalPlatform is used as a specification of an SIM service management platform.

GlobalPlatform is a secure and dynamic card and application management specification and provides an interface neutral about a card component, an instruction set, a transaction sequence, hardware, a system and an operating system (OS) and independent of applications.

The present invention may provide a structure of issuing an MNO profile to a terminal and enabling the terminal to switch to another mobile carrier without changing conventional SIM technology in an environment where the MNO owns an issuer security domain (ISD) key on the GlobalPlatform basis.

To this end, an exemplary embodiment of the present invention provides a method using a security domain (SD) having authorized management privilege or delegated management privilege defined in GlobalPlatform. A detailed configuration of the present invention will be described with reference to FIG. 3.

Figure 2:
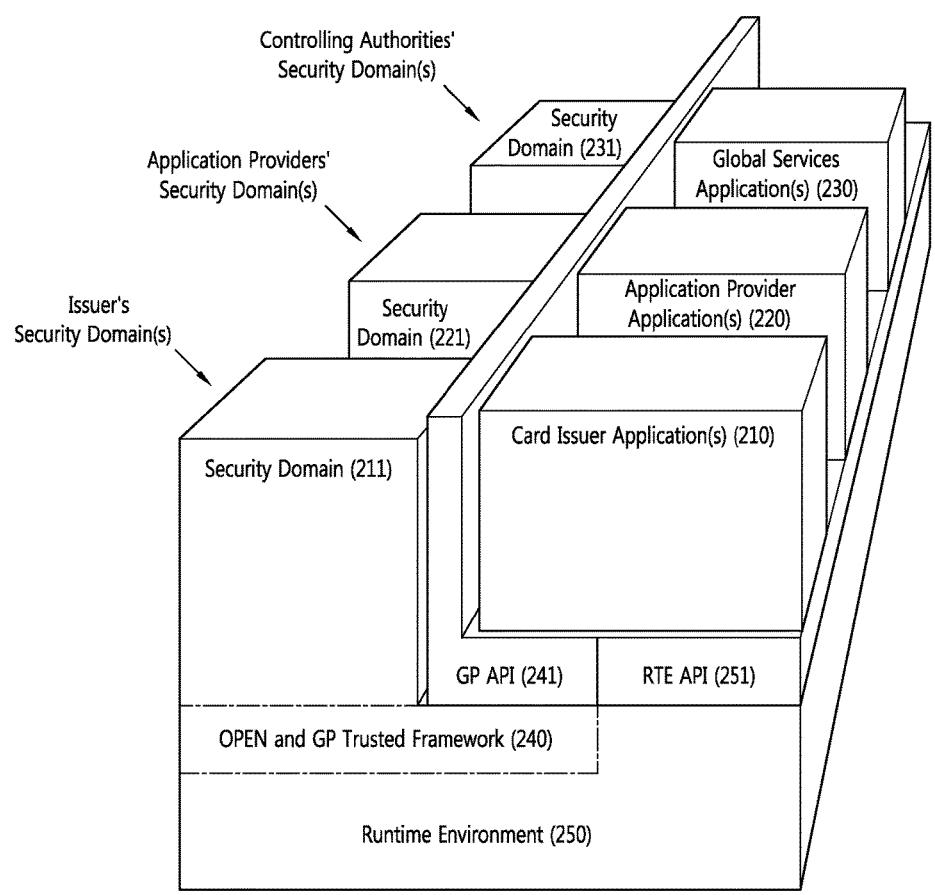
FIG. 2 illustrates a card architecture based on GlobalPlatform according to the present invention.

FIG. 2 illustrates a card architecture based on GlobalPlatform according to the present invention.

The card architecture based on GlobalPlatform includes a plurality of components to secure an interface neutral on hardware and a vendor to an application and an off-card management system.

Such components may include at least one card issuer application 210 for a card issuer, at least one application provider application 220 for a business partner of the card issuer, that is, an application provider, and at least one global service application 230 for providing a global service, for example, a CSM service, to another application.

Each application is associated with a relevant SD, which includes an issuer SD (ISD) 211, a service provider SD 221 and a controlling authority SD 231.

All applications are implemented in a secure runtime environment 250 including an API neutral on hardware supporting mobility of the applications. GlobalPlatform does not limit a runtime environment to particular runtime environment technology and is a major card component that a card manager serves as a central manager. A special key and a security management application called an SD are generated to secure complete separation of keys between the card issuer and a plurality of different SD providers.

A GlobalPlatform environment (OPEN) and a GP trusted framework 240 are disposed under the applications and the SDs, and the runtime environment 250 is formed thereunder.

Further, a GP API 241 is provided between the applications/SDs and the GlobalPlatform environment (OPEN) and the GP trusted framework 240, and a runtime API (RTE API) 251 is provided between the applications/SDs and the runtime environment 250.

The SDs, such as the ISD 211, the service provider SD 221 and the controlling authority SD 231, serves as on-card representatives of off-card authorities. The SDs may be largely divided into three types according to three types of off-card authorities perceived by a card.

First, the ISD 211 is a main and essential on-card representative for a card administrator that is generally a card issuer.

Second, a supplementary SD functions as an additional and optional on-card representative for a card issuer, an application provider or an agent thereof. The service provider SD 221 is the supplementary SD (SSD).

Third, a controlling authority SD is a special supplementary SD. A controlling authority serves to compel a security policy applied to all application codes loaded into a card. Also, the controlling authority may use a controlling authority SD as an on-card representative thereof so as to provide such function. At least one controlling authority SD may be present.

Generally, three types of SDs may be simply referred to as SDs, which support security services, such as key handling, encoding, decoding, creating an electronic signature and verification, for the providers thereof (the card issuer, the application provider or the controlling authority. Each SD is set up instead of the card issuer, the application provider or the controlling authority when an off-card entity requests use of a completely isolated key.

Meanwhile, at least one global service application 230 is present in the card, thereby providing a cardholder verification method (CVM) service to another application on the card.

GlobalPlatform is used to enable operations in a secure multi-application card runtime environment. The runtime environment 250 provides not only secure storage and implementation space for applications but an API neutral on hardware for the applications, so that a code and data of each application are securely retained separately from another application. The runtime environment of the card also provides a communication service between the card and an off-card entity.

The GlobalPlatform card may include at least one trusted framework 240, which provides communications between applications. The trusted framework is neither an application nor SD but may exists as an extension or part of the card runtime environment.

As described above, GlobalPlatform is a specification for managing applications (applets) of a smart card, such as an SIM. GlobalPlatform defines software representing a card issuer (for example, MNO) as an ISD and performing overall necessary management functions and software of an SSD for a business partner of the card issuer (for example, an application provider such as a bank and a credit card company) to securely manage service software and information thereof (for example, banking applets and account information).

However, due to a physical difference from a conventional detachable SIM, the eSIM environment involves management of SIM data in a software form, and accordingly methods based on GlobalPlatform technology are currently under discussions. However, a structural definition that an MNO owns an ISD key and develops an eSIM business based on the ISD key is needed due to issues about ownership of the ISD key and initiative in eSIM based business (communications and optional services) on GlobalPlatform.

Thus, the present invention discloses an eSIM management method on the basis of authorized management and delegated management on an existing GlobalPlatform specification, particularly a basic opening structure and a structure and a process of switching to a different mobile carrier.

Figure 3:
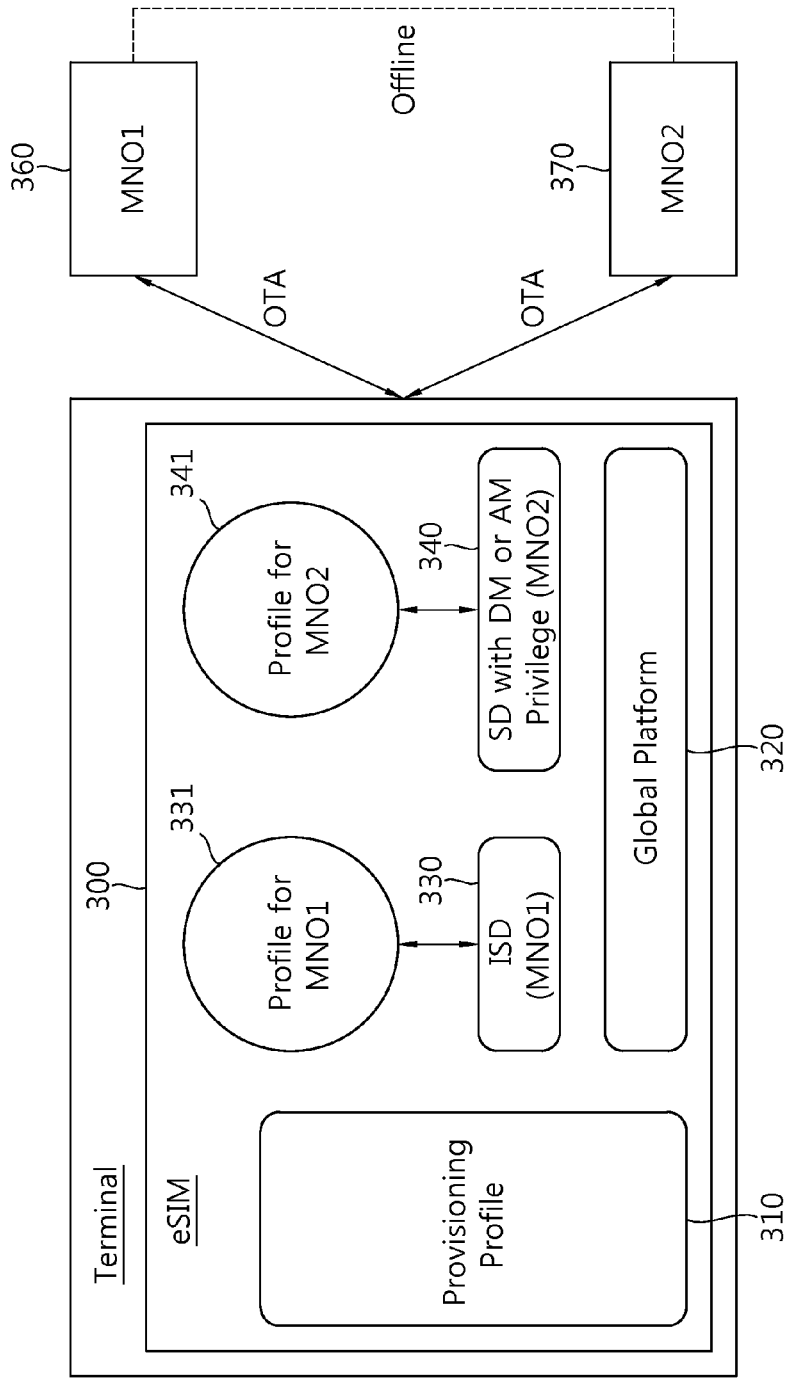
FIG. 3 illustrates an internal structure of an eSIM and relationship between the eSIM and external MNOs according to an exemplary embodiment of the present invention.

FIG. 3 illustrates an internal structure of an eSIM and relationship between the eSIM and external MNOs according to an exemplary embodiment of the present invention.

A system according to the present embodiment includes an eSIM 300 and one or more MNO systems 360 and 370.

The eSIM 300 includes a provisioning profile 310, GlobalPlatform 320, and an ISD 330 and an SD 340 in a higher level than GlobalPlatform.

The ISD is a main and essential on-card representative for a card administrator that is generally a card issuer, which denotes a main on-card entity supporting communication requirements, control and security of the card administrator.

Further, the eSIM includes profiles 331 and 341 of one or more MNOs, wherein the profile 331 of an initial opening MNO, MNO1, is managed by the ISD 330 and the profile 341 of an additional MNO, MNO2, is managed by the SD.

The SD 340 is an SD having authorized management privilege or delegated management privilege, and the authorized management privilege or delegated management privilege will be described in detail.

Terms used in the specification are defined as follows.

An MNO is a wireless service provider, which refers to an entity to provide customers with communication services through a mobile network.

Provisioning is a process of loading a profile into an eUICC, and a provisioning profile refers to a profile used for a device to connect to a communication network so as to conduct provisioning of another provisioning profile and operation profile.

Subscription refer to commercial relationship between a subscriber and a wireless communication service provider.

A profile is a combination of a file structure, data and an application to be provisioned to the eUICC or managed in the eUICC, which includes all information present in the eUICC, such as an operation profile as operator information, a provisioning profile for provisioning and a profile for a policy control function (PCF).

An operation profile or operator information refers to any kind of profile related to operational subscription.

Card content refers to a code and application information (not application data) included in a card under responsibility of the OPEN, for example, an executable load file and an application instance.

A card issuer is an entity that owns a card, which is responsible for all aspects of the card.

An ISD is a main on-card entity that provides supports for communication requirements, control and security of a card administrator.

An SD is an on-card entity that supports control, security and communication requirements of an off-card entity, for example, a card issuer, an application provider or a controlling authority.

Delegated management (DM) means pre-authorized card content change conducted by an authorized application provider, and a token is a cryptographic value provided by a card issuer to confirm that a delegated management operation is authorized.

A controlling authority is an entity having privilege to maintain control of card content through an authority to verify a data authentication pattern (DAP).

Privilege on an SD, particularly an ISD, is formalized, thereby clarifying authority to access a card content management function. The ISD has an explicit privilege set, which may include authorized management (AM) or a new type of privilege, such as token-based authentication.

An SD having AM privilege allows an SD provider to manage card content management without token-based authentication when an off-card entity is authenticated as a owner of the SD, that is, the SD provider. In this case, an SD having privilege over token-based authentication is not involved. However, a token is still needed for a case where the off-card entity is authenticated but is not the SD provider.

Delegated management privilege enables an SD of an application provider having the privilege to perform delegated loading, delegated installation, delegated extradition, delegated updating to a GlobalPlatform registry and delegated deletion.

Delegated management privilege allows the application provider to manage card content via authentication, and authentication is controlled by an SD having token-based authentication privilege. Such delegated management is not an essential characteristic of a GlobalPlatform card.

That is, as shown in FIG. 3, the eSIM 300 according to the present embodiment includes the provisioning profile 301 to conduct issuing through all networks, for example, MNO1 and MNO2, and GlobalPlatform 320 having authorized management and delegated management functions.

The MNO1 system 360 and the MNO2 system 370 may serve to perform GlobalPlatform-based card management functions (establishing a communication channel for mutual authentication with an SIM and security and issuing applications and data). MNO1 and MNO2 may need to be under prior agreement for transfer to another service provider.

Hereinafter, details on GlobalPlatform technology relevant to the present invention will be described.

An SD is an privileged application, which has cryptographic keys used to support a secure channel protocol operation or to authorize a card content management function.

Each application and each executable load file may be related to the SD, wherein the application may use a relevant encryption service of the SD.

All cards have one essential SD, which is referred to as an ISD. Due to a card supporting multiple SDs, an application provider may manage own applications through a own SD of the application provider and provide an encoded service using a key completely separated from a card issuer.

The SD is responsible for management of its own key, and accordingly applications and data from a plurality of different application providers may be present in the same card without violating privacy and integrity of each application provider.

An encryption process related to keys of all SDs may provide secure support for communications while an application of an application provider is personalized and enables safe communications while an application not including secure messaging keys of the SDs is implemented.

An ISD generally operates as a single particular SD but has distinguished features from other SDs.

That is, although the ISD is an application initially installed in the card, the ISD is not necessarily loaded or installed in the same manner for each application. Further, the ISD has a card life cycle state internally and thus does not have an SD life cycle state. When a privileged application is removed, the ISD has authority to reset the card.

In addition, when an application implicitly selected on the same logic channel of an I/O interface of the same case is removed, the ISD becomes an implicitly selected application and may be selected according to a SELECT instruction not having a command data field.

An application including an SD may use a service of a relevant SD to the application to provide a secure channel session and another encoding service. The application does not need to know an SD application identifier (AID) in advance, while the GlobalPlatform registry provides the SD AID and the OPEN provides a standard of the relevant SD to the application. Since the relevant SD may be changed by extradition, the application may not need to store the standard.

Extradition is a method to associate an application with another SD. Although an executable load file is first associated with an SD loading the load file, the load file is immediately extradited to another SD through implicit extradition or sequentially extradited to another SD through explicit extradition during a loading process.

An IDS is not for extradition, while an SD may be associated with itself through extradition. An SD may be further separated from another SD using privilege allocated to the other SD, and consequently one or more associated layers may be formed on the card. A root of each layer becomes an SD associated with the root.

An application may access a service of a relevant SD. The application may rely on support for encoding from the SD using the service, securing confidentiality and integrity during personalization and runtime. The SD service may have characteristics as follows.

The SD starts a secure channel session on successful authentication of an on-card entity, unwraps a received instruction in the secure channel session by verification of integrity or decodes original data under secure confidentiality.

In addition, the SD controls a sequence of APDU instructions, decodes a confidential data block, and sets a security level of confidentiality or integrity which is applicable to a next inflow instruction or next outflow response. Further, the SD service closes the secure channel session and removes confidential data related to the secure channel session upon request.

Depending on whether to support a particular secure channel protocol, the SD may have a function of wrapping a response transmitted within the secure channel session by adding confidentiality, a function of encoding the original data under secured confidentiality, or a function of encoding a confidential data block and controlling a sequence of APDU responses.

The SD may simultaneously manage multiple secure channel sessions, that is, a plurality of applications selected in a plurality of logic channels each starting a secure channel, and control to manage only one secure channel session among a plurality of applications simultaneously selected to use services. When the SD supports simultaneously managing the multiple secure channel sessions, the SD may need to divide the multiple secure channel session and the logic channels thereof. When the SD does not support simultaneously managing the multiple secure channel sessions, the SD may reject a request for starting a new secure channel session when the request for opening a secure channel session is made to another logic channel different from a current secure channel session.

Also, the SD may receive a STORE DATA instruction toward one of associated applications. The SD unwraps the instruction according to a security level of the current secure channel session before the instruction is forwarded to the application.

The ISD may need to process an issuer identification number (IIN), a card image number (CIN), card recognition data and card issuer dedicated data. These data may be acquired from the card through a GET DATA instruction.

An IIN is used by an off-card entity to associate a card with a particular card management system. The IIN generally includes identification information on an issuer defined by ISO 7812 and transmitted by a tag "42" of ISO/IEC 7816-6. An IIN data element has a variable length.

A CIN is used by a card management system to uniquely identify a card in a card base. The CIN is a unique value and is transmitted by a tag "45" (data of a card issuer) defined in ISO/IEC 7816 and allocated by the card issuer defined as the IIN. A CIN data element also has a variable length.

A card management system may need to know information on a card before conducting interactions with the card. The information may include information on a kind of the card and information on available secure channel protocols. Card recognition data is a mechanism to provide the information on the card and prevents changes of trial and error.

An SD other than the ISD may be expressed as a supplementary security domain (SDD), and the SDD handles identification data on the SDD. The identification data on the SDD may include an SD provider identification number (SIN), an SD image number, SD management data and application provider dedicated data. These data may be obtained from the card through the GET DATA instruction.

An SIN is used by an off-card entity to associate an SD with a particular card management system. The SIN generally includes identification information on an SD provider defined by ISO 7812 and transmitted by the tag "42" of ISO/IEC 7816-6. An SIN data element has a variable length.

An SD image number is used by a card management system to uniquely identify an SD instance within a card. The SD image number may be a unique value and be transmitted by the tag "45" (data of a card issuer) defined in ISO/IEC 7816.

A card management system may need to know information on a card before conducting interactions with the card. The information may include information on a kind of the SD and information on available secure channel protocols.

SD management data is a mechanism to provide information on the SD and prevents changes of trial and error. The SD management data is included in a response to the SELECT instruction and returned, and may be included in a response to the GET DATA instruction and returned.

Information provided to the SD management data is required to sufficiently enable the card and initial communication but is not limited to particular requirements. The SD management data needs dynamically updating by the card.

The eSIM 300 according to one exemplary embodiment stores a profile of at least one MNO, receives an SD having delegated management privilege or authorized management privilege over a receiving MNO from a donor MNO system, and connects to the receiving MNO system using a provisioning profile to conduct SD authentication and to receive necessary profiles or data (opening data and preinstalled optional service data).

Also, when the eSIM 300 receives the SD having delegated management privilege or authorized management privilege over the receiving MNO from the donor MNO system, the eSIM may inactivate a profile of the donor MNO.

In addition, after an issued profile or data needed for the receiving MNO is received, the eSIM according to the present embodiment may change an SD key value into a unique SD key value recognized only by the receiving MNO system.

An eSIM 300 according to another exemplary embodiment of the present invention stores a profile of at least one MNO. When a return request is received from an initially opening MNO system, the eSIM 300 connects to the initially opening MNO system using a provisioning profile to delete a profile (including an SD) of an MNO currently activated using an ISD key and to change a profile of the initially opening MNO inactivated into an activated state.

Accordingly, the initially opening MNO returns from another MNO system, the services provided by the initially opening MNO may be utilized as the terminal did previously.

An eSIM 300 according to still another exemplary embodiment of the present invention stores a profile of at least one MNO. When a subscription change occurs from a donor MNO to a receiving MNO, with an initially opening MNO separately existing, the eSIM 300 receives an SD having delegated management privilege or authorized management privilege over the receiving MNO from the initially opening MNO system, deletes a profile (including an SD) of the donor MNO, and connects to the receiving MNO system using a provisioning profile to conduct SD authentication and to receive necessary profiles or data (opening data and preinstalled optional service data).

Hereinafter, an ISD key and an SD key used in one exemplary embodiment of the present invention will be described.

The ISD key and the SD key according to the present embodiment have characteristics as follows.

The ISD key or SD key includes a key identifier to identify each key in an on-card entity. A key includes one or more key components. For example, a symmetric key has one key component, while an asymmetric key includes a plurality of components. All key components share the same key identifier, and different key identifiers are used in one on-card entity to distinguish keys, purposes and functions thereof. There is no restriction or predetermined order in allocating key identifiers to keys, and non-consecutive key identifiers may be used in the same entity.

The SD key has a characteristic of an associated key version number. Different key versions may be used to distinguish a plurality of instances or versions of the same key in one on-card entity. There is no restriction or predetermined order in allocating key version numbers to a key.

Further, the SD key has a characteristic of an encryption algorithm, in which a particular key may be associated with only one encryption algorithm. A length of an encryption algorithm supporting a plurality of key lengths and access conditions for accessing or controlling a key may be characteristics of the SD key.

Such characteristics of the key may enable an identity, intended purposes and functions of an encryption key to be clearly directed to the on-card entity.

A particular key may be clearly identified in the on-card entity by a combination of a key identifier and a key version number, and an encryption algorithm and a key component are identified by a key type. A key and an algorithm are clearly distinguished in the entity, thereby preventing misuse of an encryption function. An off-card entity may acquire information on the SD key using the GET DATA instruction of a key information template (tag "E0").

Meanwhile, a method that the SD manages a key according to an exemplary embodiment of the present invention is as follows.

A key identifier and a key version number uniquely refer to each key in an on-card entity, and each key identifier/key version number combination represents a unique key slot in the entity.

Adding a key means allocating a new key slot with a new key value, a new key identifier or a new key version number. Replacing a key is associated with updating a key slot with a key version number related to a new key value. A key identifier still remains the same, and a previous key is not used any more.

An off-card key management system may need to know a key identification method performed by an on-card entity. A key identifier and a key version number may have random values with respect to a particular card, and these values may be changed from one key management method to another method.

An SD may need to store all key information provided via a PUT KEY instruction.

Three access conditions may be allocated to the SD key, which are access by the SD, access by an authorized user, for example, an associated application of the SD, other than the owner, and access by all authorized users including the owner of the SD key.

The access conditions to the SD key may be represented by one byte. For example, "00" represents any authorized user including the owner, which is a basic access condition with respect to a secure channel protocol key when not explicitly provided via the PUT KEY instruction, "01" represents the owner, that is, the SD, which is a basic access condition with respect to a token and DAP key when not explicitly provided via the PUT KEY instruction, and "02" represents an authorized user other than the owner, without being limited to the foregoing examples. Access control regulations applicable to a particular SD key may be enforced as follows.

To use a particular SD encryption service, an application asks the OPEN for reference to a secure channel interface, while the OPEN may identify an SD related to the application and provides reference to the secure channel interface corresponding to the application.

Further, the application may ask the SD for an encryption service via the secure channel interface, while the OPEN may allow access only by the related application.

Data and keys are managed in the following manner. When a data/key management request is received, a relevant SD manages the key/data according to access control regulations of the SD and a card life cycle is not in a CARD_LOCKED or TERMINATED state.

When a DELETE KEY, PUT KEY or STORE DATA instruction is received, the SD conducting data or key management applies a secure communication policy of the SD, and an SD provider may apply a key management policy related to deletion of a key.

Figure 4:
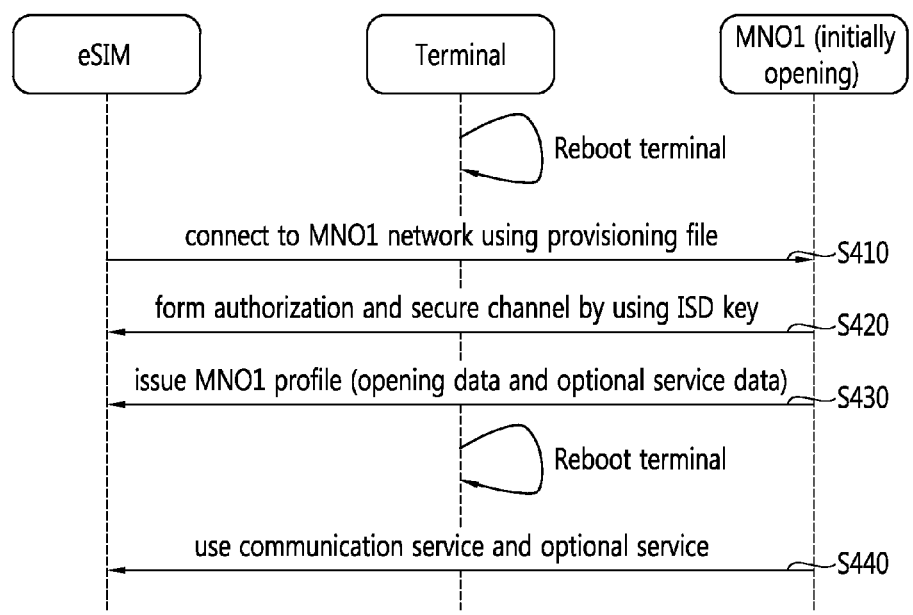
FIG. 4 is a flowchart illustrating a provisioning process using an eSIM according to an exemplary embodiment of the present invention.

FIG. 4 is a flowchart illustrating a provisioning process using an eSIM according to an exemplary embodiment of the present invention.

As a prerequisite for the provisioning process and an MNO change process to be described below, a provisioning file is preinstalled in the eSIM. The provisioning file may be applied equally to all MNOs. Each MNO needs to allow access to a profile via a network so that the eSIM is managed through the provisioning profile.

As shown in FIG. 4, in the provisioning process using the eSIM according to the present embodiment, a terminal equipped with the eSIM connects to an MNO1 network using the provision profile of the eSIM when booted up (S410). Then, an MNO1 system establishes a mutual authorization and secure communication channel with the eSIM using an ISD key (S420). Subsequently, the MNO1 system issues the eSIM with an MNO1 profile, opening data for communications (for example, IMSI, Ki and OPc), data on optional services to be preinstalled (for example, infraapplets for transportation cards and credit cards) and data necessary for issuing through the secure communication channel (S430).

When the terminal is rebooted after the profile or data are completely issued in S430, the terminal conducts communications via the MNO1 network and utilizes optional services offered by MNO1 (S440).

Figure 5:
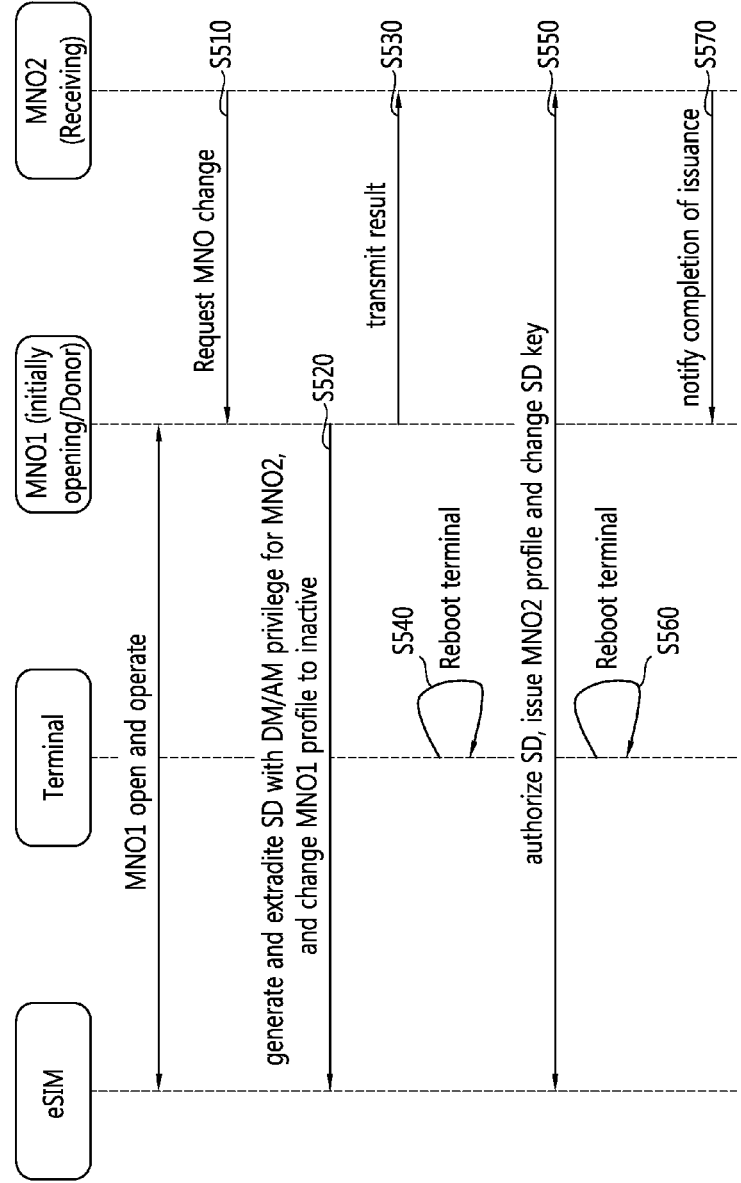
FIG. 5 is a flowchart illustrating an MNO change process using an eSIM according to an exemplary embodiment of the present invention.

FIG. 5 is a flowchart illustrating an MNO change process using an eSIM according to an exemplary embodiment of the present invention.

In FIG. 5, MNO1 is an initially opening MNO and donor MNO and MNO2 is a new receiving MNO after the MNO change.

In the MNO change process using the eSIM according to the present embodiment, a request message for a change to another service provider or an MNO change is transmitted from an MNO2 system to an MNO1 system (S510).

In S520, the MNO1 system as the initially opening MNO and donor MNO generates an SD having authorized management privilege or delegated management privilege for MNO2 using an ISD key. Here, an SD key of the SD having authorized management privilege or delegated management privilege is a key injected in advance from the MNO2 system to the MNO1 system through a hardware security module (HSM). The MNO1 system extradites the SD to disassociate the generated SD from an ISD and inactivates an MNO1 profile (communications and optional services) of the eSIM.

Next, the MNO1 system notifies the MNO2 system that the MNO1 system is ready for a change to another service provider or an MNO change (S530).

A terminal is rebooted (S540) and connects to an MNO2 network through a provisioning profile. The MNO2 system conducts SD authorization using the SD key and issues applications of preinstalled optional services and opening data using the authorized management privilege or delegated management privilege acquired from the ISD. Then, the MNO2 system changes the SD key to a key recognized only by MNO2 (S550).

Next, when the terminal is rebooted (S560), the terminal performs communications via the MNO2 network and utilizes optional services offered by MNO2, while the MNO2 system notifies the MNO1 system that the issue is completed (S570).

Figure 6:
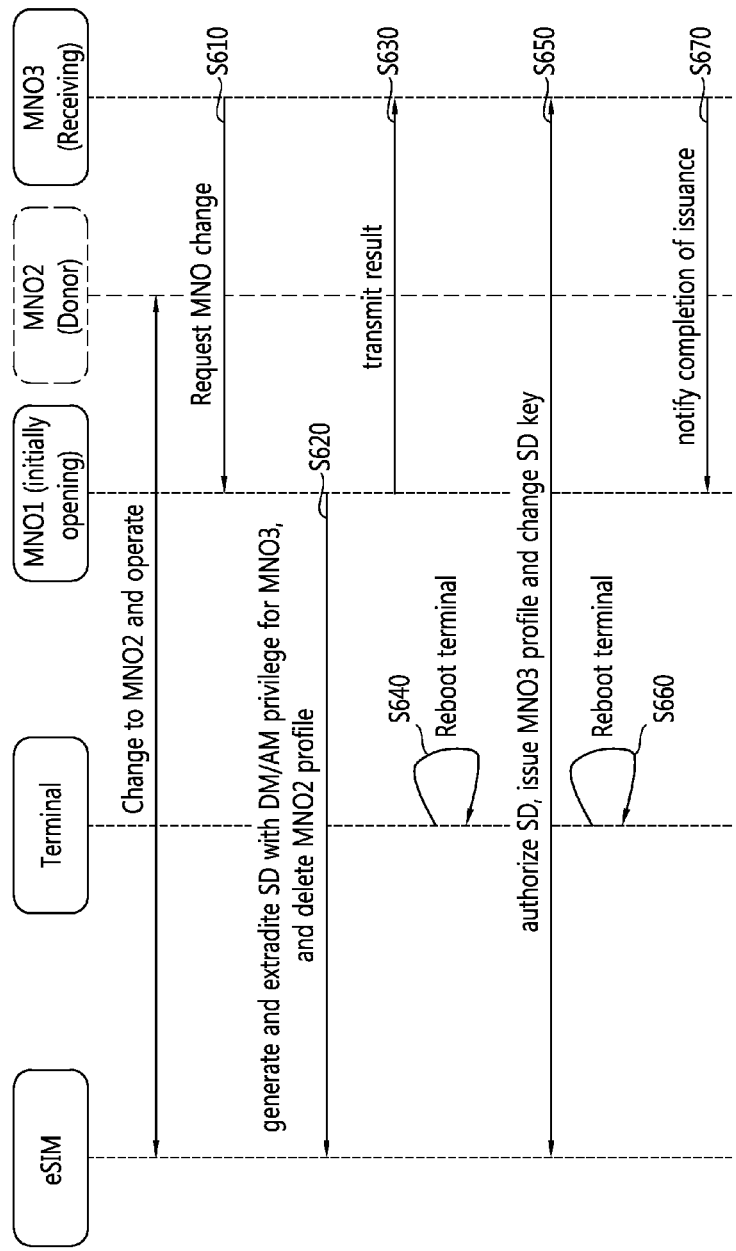
FIG. 6 is a flowchart illustrating an MNO change process using an eSIM according to another exemplary embodiment of the present invention, in which an initially opening MNO is not a donor or receiving MNO.

FIG. 6 is a flowchart illustrating an MNO change process using an eSIM according to another exemplary embodiment of the present invention, in which an initially opening MNO is not a donor or receiving MNO.

In FIG. 6, unlike FIG. 5 where the initially opening MNO is a donor MNO, MNO1 is the initially opening MNO, MNO2 is a donor MNO before an MNO change, and MNO3 is a new receiving MNO after the MNO change.

In the MNO change process using the eSIM according to the present embodiment, a request message for a change to another service provider or an MNO change is transmitted from an MNO3 system to an MNO1 system as the initially opening MNO (S610).

In S620, the MNO1 system as the initially opening MNO generates an SD having authorized management privilege or delegated management privilege for MNO3 as the receiving MNO using an ISD key. Here, an SD key of the SD having authorized management privilege or delegated management privilege is a key injected in advance from the MNO3 system to the MNO1 system through a hardware security module (HSM). The MNO1 system extradites the SD to disassociate the generated SD from an ISD and deletes a profile of MNO2 as the donor MNO.

Next, the MNO1 system notifies the MNO3 system that the MNO1 system is ready for a change to another service provider or an MNO change (S630).

A terminal is rebooted (S640) and connects to an MNO3 network through a provisioning profile. The MNO3 system conducts SD authorization using the SD key and issues applications of preinstalled optional services and opening data using the authorized management privilege or delegated management privilege acquired from the ISD. Then, the MNO3 system changes the SD key to a key recognized only by MNO3 (S650).

Next, when the terminal is rebooted (S660), the terminal performs communications via the MNO3 network and utilizes optional services offered by MNO3, while the MNO3 system notifies the MNO1 system that the issue is completed (S670).

That is, in the embodiment illustrated in FIG. 5, since the donor MNO is the initially opening MNO, the profile of the donor MNO is inactivated instead of being deleted. However, in the embodiment shown in FIG. 6, since the donor MNO is different from the initially opening MNO, the profile of the donor MNO is deleted.

According to the embodiment shown in FIG. 5, since the terminal may return to the initially opening MNO as illustrated in FIG. 7, the profile of the initially opening MNO is just inactivated instead of being deleted.

FIG. 7 is a flowchart illustrating a process of returning to an initially opening MNO using an eSIM according to an exemplary embodiment of the present invention.

In FIG. 7, a terminal returns from MNO2 currently in service to MNO1 as the initially opening MNO.

In the process of returning to the initially opening MNO using the eSIM according to the present embodiment, MNO1 asks MNO2 for a change to the initially opening MNO (S710).

The terminal is rebooted (S720) and connects to a network of MNO1 through a provisioning file. MNO1 deletes a profile of MNO2 (including an SD) using an ISD key and renders an inactivated profile of MNO1 activated (S730).

Then, when the terminal rebooted (S740), the terminal performs communications via the network of MNO1 and utilizes optional services offered by MNO1 as the terminal previously did. The MNO1 system notifies the MNO2 system that the terminal completely returns to the initially opening mobile carrier (S750).

According to the present invention described above, an MNO holding an IDS key may issue an MNO profile to a terminal and enables the terminal to change to another mobile carrier (another MNO) without changing existing SIM technology in an eSIM environment. Accordingly, the MNO holding the ISD key may continue to secure initiative in communication opening and optional service business based on standard technologies in the eSIM environment.

Further, although not described in detail to avoid redundancy, an eSIM, an MNO system, a provisioning method and an MNO change method that conducts provisioning and an MNO change using an SD having authorized management privilege or delegated management privilege may be embodied as computer readable programs.

These programs may include codes in programming languages such as C, C++, JAVA and machine codes readable by a computer processor or CPU so that the computer reads the programs recorded in recording media to conduct the foregoing functionalities.

The codes may include functional codes related to functions defining the aforementioned functionalities and control codes related to an execution procedure needed for the computer processor to execute the functionalities according to a preset procedure.

Further, the codes may further include memory reference related codes regarding additional information needed for the computer processor to perform the functionalities or a location or address of an internal or external memory that media refer to.

In addition, when the computer processor needs communications with a remote computer or server to perform the functionalities, the codes may further include communication related codes regarding how the computer processor communicates with which remote computer or server using a wire-based and/or wireless communication module and what kind of information or media the computer processor transmits or receives in communications.

Functional programs, relevant codes and code segments to implement the present invention may be readily inferred or modified by programmer skilled in the art in view of a system configuration of the computer that reads the recording media to execute the programs.

Examples of computer-readable recording media including the programs may include ROMs, RAMs, CD ROMs, magnetic tapes, floppy disks and optical media devices.

Further, the computer-readable recording media including the programs may be distributed to a computer system connected via a network, and accordingly computer-readable codes may be stored and implemented in distributed mode. In this case, at least one of a plurality of distributed computers may implement part of the functionalities and transmit the implementation result to at least another of the distributed computers, and the other computer receiving the result may implementation part of the functionalities and provide the implementation result to other distributed computers.

Particularly, a computer-readable recording medium including an application for executing a plurality of functions or methods related to eUICC authentication information according to the exemplary embodiment of the present invention may be an application store server, a storage medium, such as a hard disk, included in an application provider server, such as a web server associated with the application or corresponding service, or an application provider server.

Although elements shown in the exemplary embodiments of the present invention are described as being constituted or operate independently, the present invention is not limited to the illustrated embodiments. That is, one or more selective elements may be combined to operate within the scope of the present invention. Further, each element may be constructed by a separate hardware constituent, while part or the whole of these elements may be also selectively combined to form a computer program having a program module that conducts some or all combined functions of one or a plurality of hardware constituents. Codes and code segments to constitute the computer program may be easily inferred by those skilled in the art. The computer program is stored in computer-readable media and read and implemented on the computer to achieve the exemplary embodiment of the present invention. The media storing the computer program may include magnetic recording media, optical recording media and carrier wave media.

The terms "including" "comprising" or "having" may be construed to denote a certain constituent element, but may not be construed to exclude the existence of or a possibility of an addition of one or more other constituent elements. Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While a few exemplary embodiments have been shown and described with reference to the accompanying drawings, it will be apparent to those skilled in the art that various modifications and variations can be made from the foregoing descriptions without departing from the essence of the present invention. The exemplary embodiments are provided not to restrict the concept of the present invention but to illustrate the present invention and do not limit the scope of the present invention. The scope of the invention is defined by the appended claims, and all differences within the scope will be construed as being included within the appended claims of the present invention.

CROSS-REFERENCE TO RELATED APPLICATION

This application claims the priority benefit of Korean Patent Application Nos. 10-2011-0067779, filed on Jul. 8, 2011, and 10-2011-0107916, filed in Oct. 21, 2011, in the Korean Intellectual Property Office under 35 U.S.C. §119 (a), the disclosures of which are incorporated herein by reference. Further, this application claims foreign priority benefits for the same reason, the disclosures of which are incorporated herein by reference.

The invention claimed is:

1. A method of changing a mobile network operator (MNO) using an embedded Subscriber Identity Module (eSIM) linked to at least one MNO, the eSIM storing a provisioning profile and a profile of the at least one MNO, the method comprising:
   receiving a security domain (SD) of a receiving MNO from a donor MNO, wherein the SD is a privileged application having a cryptographic key;
   performing an SD extradition from an SD of the donor MNO and replacing the SD of the donor MNO with the received SD;
   connecting to the receiving MNO using the provisioning profile;
   conducting SD authorization by using the cryptographic key of the SD of the receiving MNO and receiving a necessary profile or data based on a result of the SD authorization;
   inactivating a profile of the donor MNO when the eSIM receives the SD of the receiving MNO having a delegated management privilege or an authorized management privilege over the receiving MNO, from the donor MNO system; and
   changing a key value of the cryptographic key of the SD of the receiving MNO to a unique key value recognized only by the receiving MNO after the eSIM is issued with the necessary profile or data for the receiving MNO,
   wherein the SD of the donor MNO manages a first profile of the donor MNO by using a cryptographic key of the SD of the donor MNO and the SD of the receiving MNO manages a second profile of the receiving MNO by using the cryptographic key of the SD of the receiving MNO.

2. The method of claim 1, further comprising:
   receiving a return request from an initially opening MNO system;
   connecting to the initially opening MNO system using the provisioning profile; and
   deleting a currently activated profile including a security domain (SD) of a MNO using an issuer security domain (ISD) and rendering an inactivated profile of the initially opening MNO activated.

3. The method of claim 1, wherein, in response to an initially opening MNO being not the same as the donor MNO and a subscription change from the donor MNO to the receiving MNO occurs,
   receiving the SD having delegated management privilege or authorized management privilege over the receiving MNO from the initially opening MNO;
   deleting a profile of the donor MNO; and
   connecting to the receiving MNO system using the provisioning profile, and then conducting SD authorization and receiving a necessary profile or data.

4. The method of claim 1, further comprising:
   transmitting an MNO change request message from the receiving MNO to the donor MNO;
   generating the SD having delegated management privilege or authorized management privilege over the receiving MNO by the donor MNO using an issuer security domain (ISD) key; and
   connecting to the receiving MNO system and being provided with a service by a terminal equipped with the eSIM after booted up.

5. The method of claim 4, wherein an SD key of the SD having delegated management privilege or authorized management privilege over the receiving MNO is transmitted or injected in advance by the receiving MNO to the donor MNO prior to changing an MNO by a user terminal.

6. The method of claim 4, wherein said extraditing is performed by the donor MNO, in which the SD of the donor MNO is disassociated from the ISD and the SD of the receiving MNO is associated with the ISD.

7. The method of claim 3, further comprising:
   transmitting an MNO change request message from the receiving MNO to the initially opening MNO;
   generating the SD having delegated management privilege or authorized management privilege over the receiving MNO by the initially opening MNO system using an issuer security domain (ISD) key; and connecting to the receiving MNO and being provided with a service by a terminal equipped with the eSIM after a mobile terminal having eSIM embedded therein is booted up.

8. The method of claim 7, wherein an SD key of the SD having delegated management privilege or authorized management privilege over the receiving MNO is transmitted or injected in advance by the receiving MNO to the initially opening MNO.

9. The method of claim 7, further comprising extraditing, by the initially opening MNO, the SD to disassociate the SD of the donor MNO from the ISD.

10. The method of claim 1, wherein eSIM is built into a mobile terminal and cannot be detached.

11. The method of claim 1, wherein:
an issuer security domain (ISD) is a main on-card entity that controls the first profile of the donor MNO, the donor MNO initially providing access network to a mobile terminal which has the integrated eSIM,
the eSIM further stores a security management application and a separate corresponding service provider SD and a controlling authority SD,
the SD of the receiving MNO, which controls the second profile of the receiving MNO, is associated with the ISD so as to activate the second profile of the receiving MNO instead of the first profile of the donor MNO, and
the first and second profiles are operational profile which provides access to a network of a respective MNO.

12. An embedded Subscriber Identity Module (eSIM) linked to at least one mobile network operator (MNO),
the eSIM storing a provisioning profile and a profile of the at least one MNO, in which a security domain (SD) having delegated management privilege or authorized management privilege over a receiving MNO is received from a donor MNO, wherein the SD is a privileged application having a cryptographic key,
wherein an SD extradition is performed with respect to an SD of the donor MNO and the SD of the donor MNO is replaced with the received SD,
wherein the eSIM connects to the receiving MNO using the provisioning profile and then SD authorization is conducted by using the cryptographic key of the SD of the receiving MNO and a necessary profile or data is received based on result of the SD authorization,
wherein the eSIM inactivates a profile of the donor MNO when the eSIM receives the SD of the receiving MNO having the delegated management privilege or the authorized management privilege over the receiving MNO, from the donor MNO system,
wherein the eSIM changes a key value of the cryptographic key of the SD of the receiving MNO to a unique key value recognized only by the receiving MNO after the eSIM is issued with the necessary profile or data for the receiving MNO, and
wherein the SD of the donor MNO manages a first profile of the donor MNO by using a cryptographic key of the SD of the donor MNO and the SD of the receiving MNO manages a second profile of the receiving MNO by using the cryptographic key of the SD of the receiving MNO.

13. The eSIM of claim 12, wherein, in response to an initially opening MNO being not the same as the donor MNO and a subscription change from the donor MNO to the receiving MNO occurs,
the eSIM receiving the SD having delegated management privilege or authorized management privilege over the receiving MNO from the initially opening MNO system, deleting a profile of the donor MNO, and connecting to the receiving MNO system using the provisioning profile and then conducting SD authorization and receiving a necessary profile or data.

14. The eSIM of claim 12,
wherein the eSIM receives a return request from the initially opening MNO system, connects to the initially opening MNO system using the provisioning profile; and deletes a currently activated profile including an SD of a MNO using an issuer security domain (ISD) and renders an inactivated profile of the initially opening MNO activated.

15. The eSIM of claim 12, wherein the eSIM is mounted integrally into a mobile terminal so as not to be detached.

* * * * *